US006553367B2

(12) United States Patent
Horovitz et al.

(10) Patent No.: US 6,553,367 B2
(45) Date of Patent: *Apr. 22, 2003

(54) METHOD FOR OBTAINING A UNIFIED INFORMATION GRAPH FROM MULTIPLE INFORMATION RESOURCES

(75) Inventors: Oren Horovitz, Tel-Aviv (IL); Yael Karov, Raanana (IL)

(73) Assignee: Mercado Software, Ltd. (IL)

( * ) Notice: Subject to any disclaimer, the term of this patent is extended or adjusted under 35 U.S.C. 154(b) by 0 days.

This patent is subject to a terminal disclaimer.

(21) Appl. No.: 10/008,359

(22) Filed: Dec. 3, 2001

(65) Prior Publication Data

US 2002/0138469 A1 Sep. 26, 2002

Related U.S. Application Data

(63) Continuation of application No. 09/105,161, filed on Jun. 26, 1998, now Pat. No. 6,389,409.

(30) Foreign Application Priority Data

Jun. 27, 1997 (IL) .................................................. 121181

(51) Int. Cl.[7] .............................................. G06F 17/30
(52) U.S. Cl. ........................... 707/2; 707/100; 709/223
(58) Field of Search ........................ 707/2, 100, 104.1; 709/223

(56) References Cited

U.S. PATENT DOCUMENTS

| 5,903,902 | A | * | 5/1999 | Orr et al. ..................... 707/517 |
| 5,911,145 | A | * | 6/1999 | Arora et al. ................. 707/514 |
| 5,933,827 | A | * | 8/1999 | Cole et al. ..................... 707/10 |
| 6,144,962 | A | * | 11/2000 | Weinberg et al. ............. 707/10 |
| 6,199,098 | B1 | * | 3/2001 | Jones et al. ................. 709/203 |

* cited by examiner

Primary Examiner—John E. Breene
Assistant Examiner—Cheryl Lewis
(74) Attorney, Agent, or Firm—Dov Rosenfeld Inventek

(57) ABSTRACT

A method for dynamically obtaining a unified classification information graph which provides a navigation system for a user to access sought information. The method includes providing multiple information resources that include a hierarchy of categories that are associated, each, with a category. Leaf categories in the hierarchy are connected to information pages. The method further provides generating a unified classification information graph by using the hierarchy of categories and the categories of the multiple information resources. The unified classification graph includes a hierarchy of unified categories. Leaf unified categories in the hierarchy are connected to information pages, whereby, information pages accessible through the hierarchy of the multiple information resources are also accessible through the hierarchy of the unified classification information graph.

40 Claims, 5 Drawing Sheets

```
INFORMATION RESOURCE: GRAPH 1
Root
    Color monitor [connection1: URL: 1.1]
        under 14 inch [connection1: URL: 1.1.1]
        14 inch [connection1: URL: 1.1.2]
        15 inch [connection1: URL: 1.1.3]
        16 inch to 19 inch [connection1: URL: 1.1.4]
        20 inch and over [connection1: URL: 1.1.5]
    monochrome monitor [connection1: URL: 1.2]
        14 inch [connection1: URL: 1.2.1]
        under 14 inch [connection1: URL: 1.2.3]
        16 inch to 19 inch [connection1: URL: 1.2.4]
        20 inch and over [connection1: URL:  1.2.5]
```

```
INFORMATION RESOURCE: GRAPH 2
Root
    Monitor [connection1: URL:2.1]
        14 color monitor [connection1:URL:2.1.1]
        15 color monitor [connection1: URL:2.1.2]
        17 color monitor [connection1: URL:2.1.3]
        macintosh specific color monitor [connection1: URL:2.1.4]
        20 and larger color monitor [connection1: URL: 2.1.5]
        cables [connection1: URL: 2.1.6]
```

```
INFORMATION RESOURCE: GRAPH 3
Root
    monitor color [connection1: URL: 3.1]
        22 [connection1: URL: 3.1.1]
        12 to 14 [connection1: URL: 3.1.2]
            .28 dot pitch [connection1: URL: 3.1.2.1]
            .25 dot pitch [connection1: URL: 3.1.2.2]
        15 [connection1: URL: = 3.1.3]
            .31 dot pitch [connection1: URL: 3.1.3.1]
            .28 dot pitch [connection1: URL: 3.1.3.2]
            .25 dot pitch [connection1:URL: 3.1.3.3]
        19 to 21 full page [connection1: URL: 3.1.4]
            .31 dot pitch [connection1: URL: 3.1.4.1]
            .39 dot pitch [connection1: URL:  3.1.4.2]
            .25 dot pitch [connection1: URL: 3.1.4.3]
            .28 dot pitch [connection1: URL: 3.1.4.4]
        16 to 17 [connection1: URL:3.1.5]
            .31 dot pitch [connection1: URL: 3.1.5.1]
            .39 dot pitch [connection1: URL:3.1.5.2]
            .25 dot pitch [connection1: URL:3.1.5.3]
            .28 dot pitch [connection1: URL:3.1.5.4]
        cables & connectors [connection1: URL: 3.1.6]
```

FIG. 4A

```
Root

Monitor [connection 1: URL:2.1]
    Color monitor [connection1: URL:1.1,
                   connection2: URL: 3.1]
        .28 dot pitch   [connection1: URL:   3.1.2.1]
        .25 dot pitch   [connection1:  URL:  3.1.2.2]
        Unknown [connection1 URL: 1.1.1,
                   connection 2: URL:3.1.2, pf: =>12<14, nf=14]
    14 inch [connection1: URL: 1.1.2,
               connection2: URL: 2.1.1,
               connection3: URL:   3.1.2, pf:14, 12,=<nf<14]
    15 inch [connection1:URL= 3.1.3]
        .31 dot pitch [URL = 3.1.3.1]
        .28 dot pitch [URL = 3.1.3.2]
        .25 dot pitch [URL = 3.1.3.3]
        Unknown [connection1: URL: 1.1.3,
                   connection2: URL:2.1.2]
    16 inch to 19 inch [pf=>16,<19 URL= 1.1.4]
              . . .

20 inch and over   [connection1: URL:pf =>20 URL= 4.0
                            nf<20 URL = 1.1.5]
              . . .

macintosh specific color monitor[connection1: URL: 2.1.4]
    cables & connectors [connection1: URL:2.1.6,
                        connection2: URL: 3.1.6]

monochrome monitor [connection1: URL:2.1.4]
        14 inch [connection1: URL: 1.2.1]
        under 14 inch [connection1: URL: 1.2.3]
        16 inch to 19 inch [connection1: URL: 1.2.4]
        20 inch and over [connection1: URL: 1.2.5]

cables
        color monitor cables [connection1: URL: 3.1.6   pf:
                                  cables, nf: connectors]
        Unknown [connection1: URL 2.1.6]
``` pf= positive filter
nf= negative filter

FIG. 4B

METHOD FOR OBTAINING A UNIFIED INFORMATION GRAPH FROM MULTIPLE INFORMATION RESOURCES

This is a continuation of application Ser. No. 09/105,161 filed Jun. 26, 1998 now U.S. Pat. No. 6,389,409.

FIELD OF THE INVENTION

This invention relates to data retrieval and learning systems.

BACKGROUND OF THE INVENTION

In the context of distributed information systems (e.g. the Internet), there is a need to provide end users with a centralized access and search service to information residing in multiple heterogeneous on-line catalogs. These on-line catalogs should be viewed by the users as if they were using the very same access method, information classification and nomenclature. This concept is called "information integration" and is the subject of several research and development efforts. Among them are:

Stanford University Knowledge Systems Laboratory (KSL) Ontology Server Projects.

Microelectronics and Computer Technology Corporation (MCC)—InfoSleuth Project (MCC, Austin, Tex.).

The main problems associated with information integration include dealing with the different conceptualization systems and selecting resources.

Dealing with different conceptualization systems includes providing access to relevant information that is accessible through different classification methods and described using non-identical nomenclatures. This requires bridging the gap between the different conceptualization systems—the one used by the user to describe his query and those used by each of different information resources. These conceptualization differences range from different classification methods to different nomenclature. For example, consider a user searching for "RS232 Cable for Printer" which is listed in one on-line catalog under the name "RS232 cable" in the sub-section called "Accessories" in the super-section called "Printers" and in another on-line-catalog under the name "Printer cable" in the section "Hardware accessories." This is a very tough task, since it involves the formalization of "knowledge."

Dealing with resource selection includes deciding which one of the available information resources is relevant for a specific information request. For example, there is no point in accessing resources providing information about restaurants when the user is looking for an automobile. In the domain level, this is an easy task. However, in larger arrays of information resources from similar domains, the problem becomes harder.

The research projects listed above deal with different aspects of these problems and make different assumptions about the environment. However, prior to the present invention, there have been no general-purpose information integration systems. There are two main reasons for this:

1. There are no automatic mechanisms to "connect" to new information resources. Current solutions to the task of connecting to information resources are based on the assumption that "someone"—either the information requester or the information provider—provides an information source "wrapper" that enables "smooth" integration to the data.

2. There was no way to automatically create a large-scale conceptualization system. A current solution to the problem of creating a common unified conceptualization system is a manual solution provided by the Knowledge System Laboratory (KSL) at Stanford University. The KSL staff has developed a set of tools and services to support the process of manually building and achieving consensus on a common shared conceptualization system (termed "Ontology").

It is only natural, then, that the lack of a real world conceptualization system adversely affects both the quality of the information being retrieved—recall and precision—and the quality of the user-computer interaction. That is, real world information integration requires the automatic acquisition of a conceptual knowledge base, i.e., a conceptualization system.

In recent years, the task of automatic knowledge acquisition was usually approached by corpus-based NLP. Free text documents were used as a source for learning different relations between words, e.g., by contextual similarity.

SUMMARY OF THE INVENTION

The emergence of a global standard computer network, and more specifically, the Internet, has led to the proliferation of classified on-line catalogs. This enables use of information navigation systems. One of the innovations of the present invention is the usage of the knowledge embedded in these very navigation systems as a new source for the knowledge acquisition task in order to generate a so called unified classification information graph. Information navigation systems, by their nature, imply hierarchy relations between categories, hence they provide more precise category-relations information then free text does. The categories and the hierarchy relations between categories is utilized in the process of generating the unified classification information graph.

The present invention offers a solution to overcome the difficulties in the usage of multiple resources so as to generate the desired unified classification information graph. For example, the same piece of information may be expressed in different word order or levels of abstraction.

Since on-line catalogs are by nature subject to frequent (and occasionally also major) changes—e.g., new products/categories are added and/or others are deleted—it is important to assure that all or at least most of the modifications that occur in the on-line catalogs will be reflected in the resulting unified classification information graph. Accordingly, one of the important advantages of the system is the dynamic nature thereof, i.e., the ability to dynamically scan the multiple information resources and update, whenever required, the resulting unified information graph.

Thus the invention fulfills a long felt need by providing a system and method for obtaining and integrating multiple classification information resources using a single unified access interface.

One aspect of the invention provides for a method for dynamically obtaining a unified classification information graph that provides a navigation system for a user to access sought information. The method includes providing multiple information resources that include a respective hierarchy of categories each of which is associated with a category; leaf categories in said hierarchy being connected to information pages. The method also includes generating a unified classification information graph utilizing at least the hierarchy of categories and the categories of said multiple information resources; said unified classification graph includes a hierarchy of unified categories; leaf unified categories in said hierarchy being connected to information pages. Information pages accessible through the hierarchy of said multiple information resources are also accessible through the hierarchy of said unified classification information graph.

In one embodiment, the providing multiple information resources includes providing at least some of the multiple information resources that are located in sites of the Internet.

In another embodiment, the providing multiple information resources includes providing at least some of the multiple information resources that are located in databases.

In still another embodiment, the providing multiple information resources includes providing at least some of the multiple information resources that are located in an on-line catalog.

Still further, there is provided the step of associating categories in the hierarchy of categories in the multiple information resources with hyperlinks.

Yet still further, there is provided the step of associating categories in the hierarchy of categories in the multiple information resources with menus.

In one embodiment, the generating of a unified classification information graph includes:

initializing so as to generate a respective "link graph" that corresponds to each information resource. The link graph includes link graph categories.

normalizing the link graph categories so as to generate a classification graph that includes classification graph categories.

unifying the classification graph so as to generate the unified classification information graph.

In this embodiment there is further provided the step of providing URL pointers of the on-line catalog for generating the link graph.

Another aspect of the invention provides for a machine having a memory that contains data representing a unified classification information graph generated by the above method.

Still further, there is provided memory for storing data accessible by an application program, which program is accessed by a user through a user interface for the user to access sought information. The application program is executed on a data processing system. The data includes a data structure stored in the memory, the data structure including a unified classification information graph generated from multiple information resources. The unified classification information graph includes a hierarchy of unified categories; leaf unified categories in said hierarchy being connected to information pages. Information pages that are accessible through the multiple information resources are also accessible through the hierarchy of the unified classification information graph.

The invention further provides for a system for dynamically obtaining a unified classification information graph that provides a navigation system for a user to access sought information. The system includes an input device receiving multiple information resources that include a respective hierarchy of categories each of which associated with a category. Leaf categories in the hierarchy are connected to information pages. The system also includes a generator, generating a unified classification information graph utilizing at least the hierarchy of categories and the categories of said multiple information resources. The unified classification information graph includes a hierarchy of unified categories. Leaf unified categories in the hierarchy are connected to information pages. Information pages accessible through the hierarchy of the multiple information resources are also accessible through the hierarchy of said unified classification information graph.

Another aspect of the invention provides for use with a unified classification information graph generated by the above method, a method for retrieving information of interest. The method includes providing a user query, and identifying unified categories in the unified classification information graph which substantially match said query. According to the latter embodiment there is further provided the step of identifying the at least one information page in the unified classification information graph that is connected to the unified categories.

Preferably, any information page that is connected to a leaf unified category in the unified classification information graph contains information that can be described by the unified category information of said unified leaf category. Unified category information stands for the unified category of the leaf category and the unified categories of all its ancestors in the hierarchy.

Still further, preferably, all the information pages in the multiple information resources that contain information that can be described by the unified category information of said leaf unified category are connected to the latter.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 4A–4B are two schematic illustrations depicting an example of respective input and output learn phases.

DETAILED DESCRIPTION OF A PREFERRED EMBODIMENT

Introduction

The key elements of the method of the preferred embodiment will be presented in terms of an electronic commerce application over an Internet client server environment in which the information integration capabilities of this invention are advantageous. Further environments and different configurations and the modifications they entail will be specified below.

The application of Internet Electronic Commerce is based on the use of electronic storefronts and on-line catalogs. These catalogs are built specifically to enable customers to electronically browse in search of goods. From a customer's perspective, the business interaction process of identifying the right products and services, locating potential suppliers, and closing a deal that provides the best value for the money involves a great deal of repetitive browsing and tedious comparison work.

The preferred embodiment described provides an information integration solution to buyers obtaining information from multiple product information resources using a single unified access interface.

Electronic Commerce Client Server System Over the Internet

Figure 1:
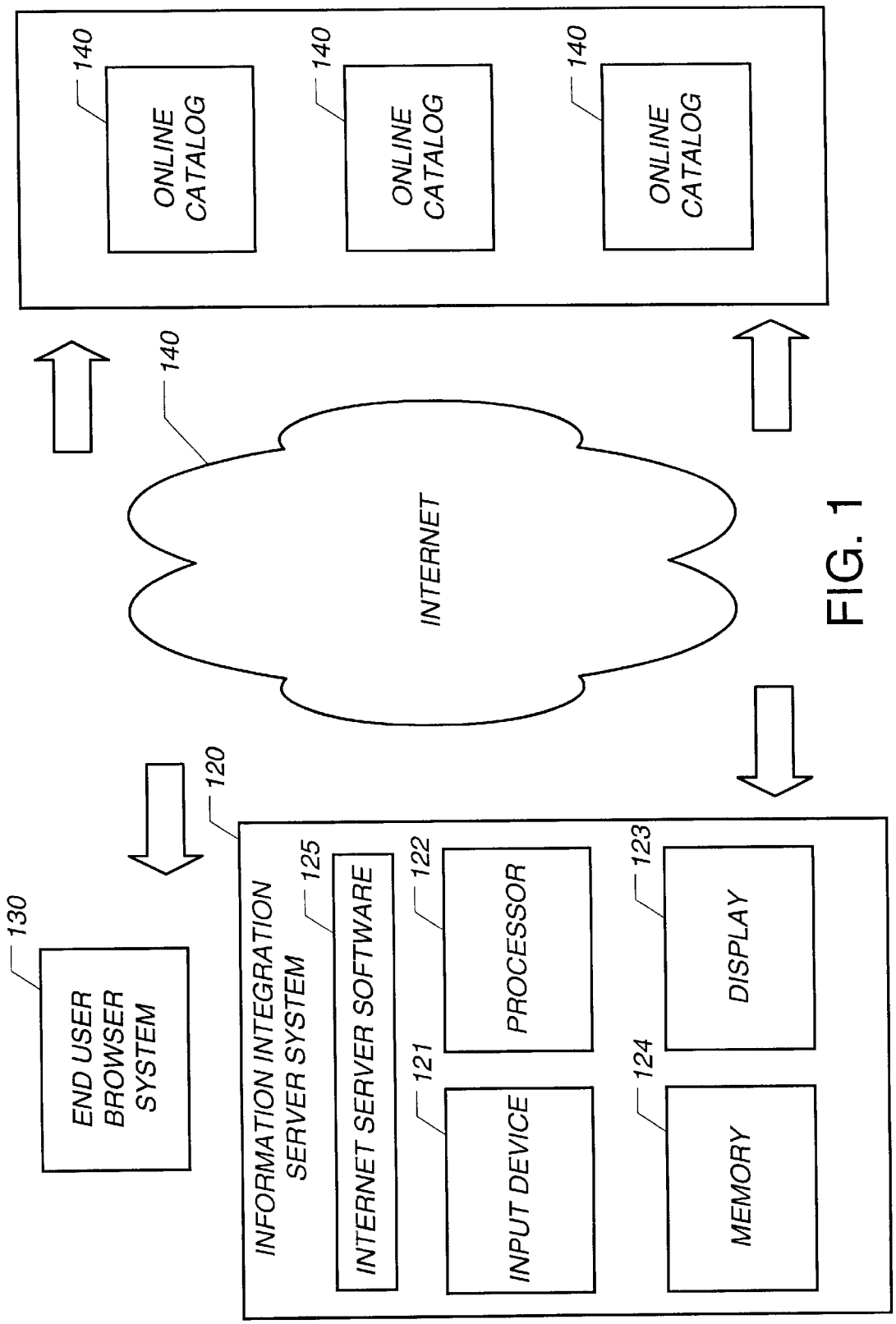
FIG. 1 is a block diagram illustrating an Internet electronic commerce client-server environment.

Referring to FIG. 1, an Internet client-server system upon which an embodiment of the present invention could be implemented is shown as 100. An Internet client-server system 100 comprises a set of on-line catalogs 110, an information integration server computer system 120, and an end-user browsing system 130.

The end-user browsing system 130 might be a personal computer, a network computer, a television with Internet operating device, or any other system setup, as long as it enables the user to interact with the Internet via a standard browser-like mechanism. As a matter of default, it enables communication with any Internet World Wide Web site, the display of standard Internet pages (the current standard is HTML), and the selection of new pages by means of hyperlink selection and full address (URL) specification.

A set of on-line catalogs 110 comprises, as an example, three on-line catalogs 111, 112, 113. An information integration server computer system 120 comprises an input device 121, a processor 122, a display 123, a memory 124, and standard Internet server software. The server software manages the communication of the information integration server computer system 120 with the Internet.

The Internet is shown as a cloud 140. This cloud symbolizes the global inter-system communication done via standard Internet protocols using standard Internet infrastructure. The communication and content delivery standards such as http, HTML, and so forth, are not an essential part of the present invention.

The invention is preferably implemented as software, and is installed on the information integration server computer system 120.

0.1. An Example of Internet On-line Catalog Logical Structure

Figure 2:
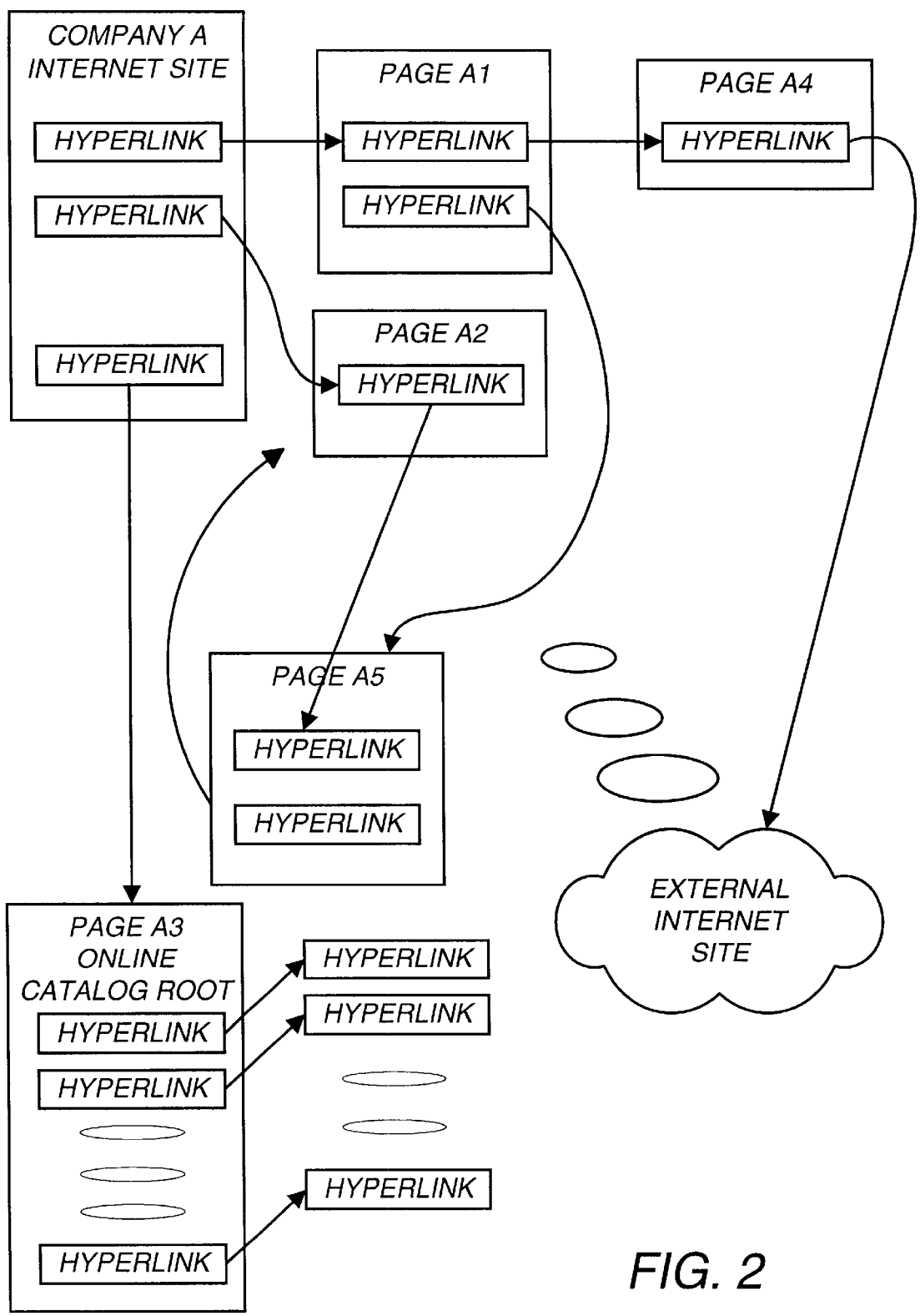
FIG. 2 illustrates a schematic structure of an on-line catalog within an Internet site.

Referring to FIG. 2, an Internet on-line catalog logical structure example is shown as 200. The Internet on-line catalog logical structure is represented by a mesh of nodes and edges. Each node represents an HTML page. Each edge represents an HTML hyperlink to another HTML page. The HTML hyperlink is possibly, but not necessarily, of the basic form <A HREF="URL">Text</A> where "Text" is the text appearing on the user's browser as the hyperlink name and "URL" is the address of the page to be accessed when the user selects this hyperlink, e.g., using his input device. Also, the specific hyperlink syntax is not an essential part of the present invention. Rather, the method could be easily adapted to each new World Wide Web page and hyper link compatible model.

A basic assumption is that for each external request of an HTML hyperlink, the Internet on-line catalog provides the relevant HTML page.

In one embodiment of the invention, it can readily be seen that the logical mesh of pages and links actually induces a graph data structure. This induced graph is not created; rather, it can be thought of as a view into the on-line catalog structure. This induced graph will be referred to as the "link graph," and is defined below.

The invention provides a method to unify any number of link graphs from multiple, often remote information resources. The resulting graph is termed a Unified Classification Information Graph (UCIG).

Integration of the link graph and its unification into the UCIG, together with a user's ability to use the UCIG information without loss of information recall or precision constitutes one variant of the invention.

A Two-Phase Operation

The invention includes two main operational phases. The "learn phase" and the "user query phase." In the first phase, hereinafter the learn phase, according to the invention, each of the on-line catalogs in the on-line catalog set 110 is accessed and a special representation of its classification information is created. Then, all the on-line catalog representations are unified into the single unified classification graph: the Unified Classification Information Graph (UCIG). The unified classification graph also includes connections to the information pages themselves, located in the on-line catalogs. An essential part of the present invention is the automatic creation of the Unified Classification Information Graph.

In the second phase (FIG. 3), hereinafter the user query phase, the user uses his end-user system 130 to issue a query to the information integration server software about a required product or service. Then, the information integration server software uses the stored unified classification to identify several relevant categories. Preferably, but not necessarily, the information integration server software may present the user with these categories. The user may select a subset of these categories as his final query. The information integration server software then accesses the relevant on-line catalogs and obtains the relevant product information pages. As an optional step, it may collate the information, and filter it according to filters prepared at the learn phase. Finally, it sends the information to the end-user system 130 to be presented to the user.

0.1.1 The Learn Phase

FIGS. 4A–4B depict an example of input and output of the learn phase. FIG. 4A illustrates three Link Graphs as derived from input information resources and the resulting UCIG, which has been generated by the algorithm described below.

As stipulated above, the resulting UCIG is connected to all information pages that are connected to the original link graphs.

Thus, the category "cables & connectors" of the input information resources depicted in FIG. 4A is present in FIG. 4B in the Unified Classification Information Graph, albeit in slightly different form. Thus, the categories of the input virtually reside also in the output.

Step 1: Initialization

In this step, a subset of the induced link graph is created according to the following rules:

1. A node (Text, URL) is created if it was induced by a hyperlink included in a categories page of an on-line catalog, and the URL points to either a categories page or a product information page within the on-line catalog (see "Page Type Identification" section below). The text is denoted by the link graph category.
2. An edge is created if and only if both nodes of the edge are created.
3. If any of the created nodes doesn't have more than one outgoing edge, i.e., if the node URL points only to a product page, then it constitutes a "leaf node." Otherwise, i.e., if the node URL points to a categories page, the node is a "non-leaf node," denoted only as a parent node.
4. An additional node is created for the on-line catalog root page Node (on-line catalog name, on-line catalog root URL). An edge is added between the root and all the nodes representing HTML hyperlinks contained in the on-line catalog categories root URL.

The resulting created graph is called the "link graph" (denoted by LinkGraph) and represents one embodiment of classification of the on-line catalog. According to one embodiment of the invention, the system administrator uses a formal graph notation to manually describe the graph—based on the creation guidelines. According to this approach, the notation is read and the corresponding graph data structure is created. This process is well known in the literature and needs no further explanation.

Step 2: Normalization

The next step in the learn phase involves the creation of what is called the "classification graph," which is a directed graph representing a normalized classification form in the sense that it obeys certain classification description rules. The classification graph is denoted by ClassificationGraph. The LinkGraph is kept for use in later stages (the LinkGraph embodies the connection to each single on-line catalog relevant page).

Step 2.1: ClassificationGraph Construction 2.1.1. For Every Node in the LinkGraph, Generate a Node in the ClassificationGraph That Contains the Following Information 1. CIG Category—initialized by the same content as the generating LinkGraph node <Text>field, represented as a list of phrases as defined by CIG category below.
2. A list of LinkGraph "node connections" (defined below) initialized to a single connection to the original LinkGraph node generating this ClassificationGraph node. A LinkGraph node connection is comprised of:
   a UCIG node;
   a LinkGraph node;
   a Positive Filter: a set of tokens that are derived from the match between the UCIG node and its connected LinkGraph node; and
   a Negative Filter: a set of tokens that are derived from the mismatch between the UCIG node and its connected LinkGraph node.

A Node Connection goal is that a UCIG node should be connected to LinkGraph nodes that have access to product information matching the UCIG node category. If the LinkGraph node accesses product pages such that only part of them match the UCIG node category, then we use Positive and Negative filters in order to filter products, and retrieve only the products relevant to the category. For example, a UCIG node with a category "586 laptop" will be connected—using a LinkGraph node connection—to all LinkGraph nodes that contain products of this type.

2.1.2 An Edge is Drawn Between Two ClassificationGraph Nodes If and Only If an Edge was Drawn Between Their Generating LinkGraph Nodes

Step 2.2: CIG Categories Transformations

The following is a typical yet not an exclusive embodiment of the normalization process which can differ from graph to graph.

In this step, tokens in various forms are taken and manipulated according to pre-set rules that can change from graph to graph. They are as follows:

1. Transform letters from upper case to lower case.
2. Transform all plural forms to singular forms, e.g., "tables" is transformed to "table."
3. Represent a category text as its individual phrases (as defined below), e.g "extension cord, power cables" comprise of the phrases "extension cord" "," and "power cables." The phrase "extension cord" comprises the tokens "extension" and "cord." The phrase "power cables" comprises the tokens "power" and "cables."
4. Transform phrases designated as needing the separator "-" between them to the correct phrases, e.g., "on line" becomes "on-line."
5. Transform a string of letters to its string of letters synonym as defined in the knowledge base, e.g., the string "phone" is transformed to "telephone."
6. Transform "-and" to "and."
7. Insert a space after the last digit in a string comprising of numbers and text. e.g., "100 MHz" becomes "100 MHz."
8. Transform text of the form "X and Y accessories" to "X accessories and Y accessories"
9. Transform text of the form "X accessories" to "X and X accessories."
10. If the category contains a number (by digits or text, e.g., "two to four," "17 inch"), then handle the intervals as described below in the "Intervals" section.

Intervals

Given a sequence of tokens in the form of a single number or a range of numbers bounded by a minimum value and a maximum value, and optionally a measurement unit, the goal it to represent the given token sequence as an interval token, comprised of:

Minimum number (min);

Maximum number (max); and

Measurement, if given (unit).

Interval construction is as follows. Given a text that contains a number, it is compared to predefined "interval templates" in order to construct its interval representation.

The following are several examples of interval templates:

1. Two phrases comprised of numbers with an interval-separator token between them signifying a set of numbers such that the token before the interval separator is the lowest limit of the boundary and the token after the separator is the highest limit. Examples of interval-separator tokens include "-", "to", ":", and so forth.
2. Any string which has one number token with a space before and after with or without a set of tokens signifying measurements such as MHz, GB, '"', cm, lb, and so forth, hereinafter termed a "unit," and/or a set of tokens such as "and above," or "and over," and so forth.

EXAMPLE 1

Text: "17 to 19"";

Interval-template: min interval-separator max unit;

Interval representation: min=17, max=19, unit='"'.

EXAMPLE 2

Text: "17 and up";

Interval-template: {min and up};

Interval representation: min=17, max=MaxInt, unit="".

Those versed in the art will readily appreciate that some normalization steps may be deleted, or modified, and others can be added, all as required and appropriate, depending upon the particular application.

Definitions. e.g., That Apply to the Present Examples

Token: A string in the category text that is bounded by a space character or the category beginning or ending. E.g., the tokens of the category "computer 486/586" are: {computer, 486,/,586}.

Text-Separator: A token of the type, but not limited to: "and", "or", "&", "/", ";", ",", "–".

Phrase: Any combination of one or more continuous tokens separated by a text-separator, or the category beginning or ending, e.g., category "laser printer & plotter," phrases: "laser printer," "&," "plotter."

CIG Category: The series of phrases that is the output of processing a LinkGraph category. For example, if the original LinkGraph category is "scanners & digital cameras," then the output UCIG category comprises the following phrases: "scanners","&," and "digital cameras."

Throughout this document, the term "category" refers to a Unified Classification Information Graph category.

Special Tokens (Given in the Knowledge Base)

Neutral Tokens: Tokens that do not add information to the category, e.g., "system," "product," and "miscellaneous."

Phrase Head Token: The token that is the head of the noun phrase, e.g., the head of "cable of printer" is "cable" while the head of "monitor connector" is "connector."

Category Head Tokens: From each phrase in the category we take its noun phrase head. This constitutes the category head tokens, e.g., the category head tokens of "cables for printer and monitor connectors" are "cables" and "connectors."

Step 3: Integration

As each new on-line catalog is learned, the output of the previous steps creates a ClassificationGraph, which is a directed acyclic graph that represents a normalized classification of the classification found in the on-line catalog. Also, the ClassificationGraph nodes contain pointers to nodes of the LinkGraph.

If this is the very first on-line catalog that is being learned, then the ClassificationGraph becomes the Unified Classification Information Graph (UCIG), also denoted by UnifiedClassificationInformationGraph that represents the cumulative classification knowledge that has been learned.

If this is not the first on-line catalog, then the next step in the learn phase is to unify the newly generated ClassificationGraph, denoted by NewGraph with the existing UnifiedClassificationInformationGraph.

A. Integrate NewGraph into UCIG

To integrate a NewGraph into the UCIG,

A.1. Initialize NonHandledNodesQueue to a queue of all nodes in the NewGraph, entered by their order in breadth first search (BFS) traversal on the NewGraph. Thus, a parent node will always be ahead of its descendants in this queue.

A.2. Initialize HandledNodesQueue to an empty queue of nodes.

A.3. While the NonHandledNodesQueue is not empty:
A.3.1 NewNode=Top of NonHandledNodesQueue.
A.3.2 Integrate NewNode into the unified ClassificationGraph (the UnifiedClassificationInformationGraph further defined below).
A.3.3 Remove NewNode from the NonHandledNodesQueue, and add it into the HandledNodesQueue.

A.4. Now the HandledNodesQueue contains all nodes from the UCIG, but in an opposite order than the initialized NonHandledNodesQueue, such that a child node is always ahead of its parent. Clean from the UCIG all nodes from the NewGraph that had children nodes in the NewGraph, such that all these children nodes are already integrated—by unify or by "add edge" as defined below—into the UCIG.

B. Integrate NewNode into the UCIG

In the description of the steps B, it is assumed by A.1 above that all ancestors of NewNode are already integrated.

B.1. Get candidates for NewNode:
B.1.1 Prepare RelevantTokens, the set of tokens that will generate candidates:
B.1.1.1 Denote RelevantTokens as all tokens from NewNode.
B.1.1.2 Remove from RelevantTokens irrelevant tokens, e.g., remove neutral tokens, and remove tokens that already appear in one of the ancestors of the NewNode.
B.1.2 Prepare RelevantCandidates, the set of nodes from UCIG that are candidates for integration with NewNode:
If the NewNode is the NewGraph root node,
then the RelevantCandidates are the root nodes of UCIG.
Else
Initialize RelevantCandidates to an empty set;
For each token in RelevantTokens, add all nodes in UCIG containing this token into RelevantCandidates (if not already there);
For every node in RelevantCandidates, if it does not contain one of the category head tokens remove it from the RelevantCandidates.

B.2. Initializations:
Initialize NewNodeTotalNonMatchedPhrases to the set of all phrases in the NewNode. In the next section B.3, the set is updated such that only phrases that were not integrated in any way to the existing nodes in the UCIG, will remain.
Initialize CandidatesContainingNewNode to an empty set of nodes.
Initialize CandidatesContainedInNewNode to an empty set of nodes.

B.3 Handle candidates:
For each candidate in the RelevantCandidates:
B.3.1 Check Match Level from the NewNode to Candidate (see section C below), and initialize the following:
NewNodeToCandidateMatchLevel,
NewNodeMatchedPhrases being phrases in the NewNode that match the candidate, and
NewNodeNonMatchedPhrases being phrases in the NewNode that do not match the candidate.
B.3.2 Check Match Level from Candidate to NewNode (see steps C), and initialize the following:
CandidateToNewNodeMatchLevel.
CandidateMatchedPhrases.
CandidateNonMatchedPhrases.
B.3.4 Decide what to do according to the found match levels:
B.3.4.1 If (NewNodeToCandidateMatchLevel= FullMatch) AND (CandidateToNewNodeMatchLevel= FullMatch or PartialMatch),
i.e., if NewNode is contained in Candidate, and Candidate is fully or partially contained in NewNode, as would occur, for example, if NewNode="cables" and Candidate="cables and connectors,"
then
Unify NewNode into Candidate with empty filters (defined below).

Remove from NewNodeTotalNonMatchedPhrases all phrases that are in the NewNodeMatchedPhrases.

B.3.4.2. If (NewNodeToCandidateMatchLevel= PartialMatch) AND (CandidateToNewNodeMatchLevel= FullMatch or PartialMatch), i.e., if NewNode is partially contained in Candidate, and Candidate is fully or partially contained in NewNode, as would occur, for example, if NewNode ="cables and connectors," and Candidate ="cables,"

then

Unify NewNode into Candidate with filters NewNodeMatchedPhrases, NewNodeNonMatchedPhrases, i.e., unify NewNode into Candidate; some of the new node phrases were found in Candidate, and some were not. Put the found phrases as positive filters, and the unfound phrases as negative filters. In the on-line search, the products connected to this category will be filtered according to the positive and negative filters, such that only products that match the filters will be shown in the search results.

Remove from NewNodeTotalNonMatchedPhrases all phrases that are in NewNodeMatchedPhrases.

B.3.4.3 If (NewNodeToCandidateMatchLevel= NoMatch) AND (CandidateToNewMatchLevel=FullMatch or PartialMatch), i.e., if Candidate is contained in NewNode and NewNode is not contained in Candidate, as would occur in the example of NewNode= "laser printer" and Candidate="printer,"

then

Add Candidate to CandidatesContainedInNewNode.

B.3.4.4 If (NewNodeToCandidateMatchLevel= FullMatch or PartialMatch) AND (CandidateToNewNodeMatchLevel= NoMatch), i.e., if Candidate contains NewNode, and is not contained in NewNode, as would occur in the example of NewNode="printer," and Candidate="laser printer,"

then

Add Candidate to CandidatesContainingNewNode.

B.4. If NewNodeTotalNonMatchedPhrases is not empty, i.e., not all phrases in the new node were unified into Candidates, B.4.1 Add edges from relevant Candidates to NewNode:

For each Candidate in CandidatesContainedInNew

Copy NewNode to NewNodeCopy.

Add edge from Candidate to NewNodeCopy (defined below).

Initialize NewNodeCopy category to {NewNode category phrases\NewNodeNonMatchedPhrases}.

If NewNode is a leaf node.

Initialize NewNodeCopy positive filter by NewNodeMatchedPhrases, and the negative filter by NewNodeNonMatchedPhrases.

Initialize NewNodeCopy parents to NewNode parents.

Remove from NewNodeTotalNonMatchedPhrases all phrases that are in NewNodeMatchedPhrases.

If NewNodeNonMatchedPhrases is empty,

Delete NewNode.

As an example, consider NewNode="laser printer & ink plotters," Candidate="printer," so the method adds an edge from the Candidate "printer" to the new node copy "laser printer," and leaves the original "laser printer & ink plotters" as it is. It will be handled at step B.5.

B.4.2 Add edges from the NewNode to relevant Candidates:

For each Candidate in CandidatesContainingNewNode:

Add edge from NewNode to Candidate (defined below).

For example, consider NewNode="laser printer & plotter," Candidate="color laser printer." The method adds an edge from the new node "laser printer & plotter" to the Candidate "color laser printer."

Remove from NewNodeTotalNonMatchedPhrases all phrases that are in NewNodeMatchedPhrases.

B.5 If NewNodeTotalNonMatchedPhrases is not empty, i.e., there are phrases in NewNode that were not unified nor that have an added edge from or to any Candidate, then Update NewNode as follows:

B.5.1 Initialize its category to the concatenation of phrases in NewNodeTotalNonMatchedPhrases.

B.5.2 If NewNode is a leaf:

then

Initialize NewNode positive filters by NewNodeTotalNonMatchedPhrases.

Initialize NewNode negative filters by {The original set of NewNode phrases\NewNodeTotalNonMatchedPhrases}.

Else, i.e., if it is a parent,

Remove from NewNode children nodes which have an additional parent, since it means that the additional parent is a Candidate that the NewNode was unified into, hence added its child nodes to it.

B.5.3 The NewNode parents are not changed.

An Example

Suppose NewNode="fax and modem," Candidate= "modem," and no Candidate in the UCIG contains the token "fax." Then NewNode "fax and modem" is unified into the Candidate node "modem" with positive filters "modem" and negative filters "fax."

NewNode name is modified to "fax," and the following filters are added to its LinkGraph node: positive filters: "fax"; negative filters: "modem."

C. Check Match Level from Node N1 to Node N2

"Ni-Phrases" means the set of phrases of node Ni and its ancestors.

Throughout the following definitions, we ignore tokens that appear in phrases of Ni-Phrases, if the knowledge base indicates that they should be ignored. For example, we ignore the following tokens:

Neutral tokens, that do not add information to the node, e.g., "product," "miscellaneous."

Tokens of ancestor nodes that represent a department of product types, such as "hardware," "office equipment," "kitchen accessories."

Tokens of ancestor nodes of N1 that are on the same semantic family (according to the knowledge base) as tokens in N2-phrases, e.g., if N1=storage—disk, and N2=disk, then "storage" is ignored, if in the knowledge base it appears as a token that is in the same semantic family of "disk."

A token match level to node Ni is:

FullMatch if the token is included in Ni-Phrases.

NoMatch if the token is not included in Ni-Phrases.

An interval token, IT, match level to node Ni is:

FullMatch if Ni-Phrases contain a phrase that contains an interval token, ITi, such that IT interval boundaries are contained in ITi interval boundaries, i.e., ITi-min <=IT-min <=IT-max <=ITi-max.

PartialMatch if no FullMatch, and Ni-Phrases contain a phrase that contains an interval token, ITi, such that ITi has an overlap with IT, i.e., ITi-min <=IT-min <=ITi-max <=IT-max, or IT-min <=ITi-min <=IT-max <=ITi-max.

NoMatch if Ni-Phrases does not contain any phrase that contains an interval token, or that every interval token that is included in Ni-Phrases does not overlap with the given IT interval, i.e., for every interval token ITi in Ni-Phrases: ITi-min <=ITi-max <=IT-min <=IT-max, or IT-min <=IT-max <=ITi-min <=ITi-max.

In addition, we demand that the unit measurements of compared intervals will not contradict.

A phrase match level to node Ni is:

FullMatch if the match level of every token in the phrase to Ni-Phrases isFullMatch.

PartialMatch if not FullMatch, and every regular token has FullMatch to Ni-Phrases, and every interval token has FullMatch or PartialMatch to Ni-Phrases.

NoMatch if there exists a token with NoMatch match level to Ni-Phrases.

As example, the phrase "color printer" has FullMatch to Ni-phrases={printer, color laserjet}, while the phrase "14 to 16 inch" has PartialMatch to Ni-phrases={monitor, 12–15}, and FullMatch to Ni-Phrases={color monitor, 12 and up} since the interval "12 and up" is represented by min=12, max=MaxInt.

A category match level to node Ni is:

FullMatch if every phrase in the category has FullMatch to Ni.

PartialMatch if there exists a phrase in the category that has

PartialMatch or FullMatch to Ni, and there exists a phrase in the category that has NoMatch to Ni.

NoMatch if no phrase in the category is included in Ni.

Consider as an example, Category="color printer and plotter" and Ni-phrases={printer, color laserjet}. In this case, the match level is PartialMatch, since one of the category phrases, "color printer," is included in the Ni-phrases, while "plotter" is not included in the Ni-Phrases.

Check Match from N1 to N2

The Match Level from node N1 to node N2 is:

FullMatch if N1 category match level to N2 is FullMatch, and every ancestor category of N1 match level to N2 is FullMatch or PartialMatch.

PartialMatch if N1 category match level to N2 is PartialMatch, and every ancestor category of N1 match level to N2 is FullMatch or PartialMatch.

NoMatch if there exists a category from N1 or its ancestors such that its match level to N2 is NoMatch.

N1-MatchedPhrases are phrases from N1 category that are included in N2.

N1-NonMatchedPhrases are phrases from N1 category that are not included in N2.

Consider as an example,

N1="printer & plotter"->"color"->"laserjet";

N2="printer"->"color"->"laserjet & inkjet";

N3="laserjet printer"->"8 pin"->"color"; and

N3-phrases={laserjet printer, 8 pin, color}.

The match level from N1 to N3 is FullMatch, since

The match level of "laserjet" to N2 is FullMatch.

The match level of the category "color" to N2 is FullMatch.

The match level of the category "printer & plotter" to N2 is PartialMatch.

N1 category has FullMatch to N3, and its ancestor categories have FullMatch or PartialMatch to N3.

N1-MatchedPhrases={laserjet}.

N1-NonMatchedPhrases={}.

Match Level from N2 to N3 is PartialMatch, since

The match level of "laserjet & inkjet" to N2 is PartialMatch.

The match level of the category "color" to N2 is FullMatch.

The match level of the category "printer" to N2 is FullMatch.

N2 category has PartialMatch to N3, and its ancestor categories have FullMatch or PartialMatch to N3.

N2-MatchedPhrases={laserjet}.

N2-NonMatchedPhrases={inkjet}.

Note:

The root is fully included in every node (since it has no tokens).

Match level is Asymetric, it is possible that N1 match level to N2 is full, and N2 to N1 match level is none, e.g., N1=printer, N2=color printer.

Unify a CIG NewNode into a UCIG Candidate

Given:

NewNode;

Candidate;

MatchedPhrases; and

NonMatchedPhrases.

Process:

1. If NewNode is a leaf and Candidate is a parent:
   Add NewNode LinkGraph connections to Candidate Unknown child (defined below) connections (if the candidate does not have an unknown child, create it).
2. If NewNode is a leaf and Candidate is a leaf:
   Add the LinkGraph connections of NewNode to Candidate node connections.
3. If NewNode is a parent and Candidate is a parent:
   Add NewNode children that match the MatchedPhrases and do not match the NonMatchedPhrases to the Candidate children.
4. If NewNode is a parent and Candidate is a leaf:
   Add NewNode children that match the matchedphrases and do not match the NonMatchedPhrases as children of Candidate.
   Create unknown child to Candidate.
   Move the Candidate LinkGraph connections to its unknown child (defined below) connections.

Unknown Child

An unknown child holds connections to LinkGraph nodes that are not known to be related to any of the sibling nodes of the unknown child. There is at most one unknown child to any parent node. This unknown child is invisible to the user. See the user query ("Query Phase") section to see how unknown children are handled given the user query.

As an example, suppose "printer" was mentioned on catalog c1 on a link pointing to a categories page with the categories "laserjet printer" and "inkjet printer." On catalog c2, "printer" was pointing to a product page. Then when the user asks for printer, he will be presented with "printer," with children "laserjet printer" and "inkjet printer" connected to c1 LinkGraph connections. The connection to catalog c2 product page of printers, could not be hanged on one of these children, since it holds unclassified printers that are not known to belong to "laserjet" or "inkjet" or any other printer. So, we add an unknown child (invisible to the user), and connect it to c2 printer product page.

Add an edge from node N1 to node N2
    If N1 is a parent node,
    Then
        Add an edge from N1 to N2.
    Else, if N1 is a leaf node,
    Then
        Add an edge from N1 to N2.
        Add an unknown child to N1.
        Move N1 LinkGraph connections to its unknown child LinkGraph Connections.

Step 4: Periodic Update of Integration

This is as follows:
Given:
    UCIG;
    An old LinkGraph connected to UCIG; and
    A new LinkGraph constructed from the same resource, where part of the new LinkGraph is identical to the old LinkGraph, part of it is newly added, and part of the old LinkGraph does not exist any more in the new LinkGraph,
the goal is to reintegrate the LinkGraph into the UCIG to reflect the changes that were made to the on-line catalog.
The process includes:
1. Update the Matched Graph under the new LinkGraph root and old LinkGraph root (as defined below). This is a recursive function, that for each node in the new LinkGraph that is found in the old LinkGraph that is connected to the unified graph, updates the URLs in the unified graph, and deletes it from the new graph.
2. Integrate the new LinkGraph into the UCIG as defined in the learn phase. This will integrate only the new nodes that appear in the new LinkGraph, and not in the old LinkGraph. Since the nodes which did not change between the LinkGraphs were deleted at the previous step 1.
3. Remove from the UCIG all connections to old LinkGraph nodes.
4. Clean from the UCIG any leaf nodes that are not connected to any LinkGraph nodes. Those nodes were connected to the old LinkGraph nodes that do not exist any more in the new LinkGraph nodes.

Update the Matched Graph (NewNode, OldNode)

The following is a description of an update function, where NewNode is a node in the new LinkGraph and OldNode is a node in the old LinkGraph. The function returns true if and only if the new node and its descendents are already connected to the UCIG.

1. Find the UCIG nodes that are connected to OldNode.
2. If found such UCIG nodes,
   Then
      Update in their LinkGraph connection the URL of NewNode instead of the URL of OldNode.
3. If NewNode is a leaf,
   Then if found connection,
      Return true.
   Else
      Return false.

In the following step (4), for a parent NewNode, the funtion recursively checks: if all the parent's children are in the unified graph, then return true. NewNode will be deleted by its calling function

---

4. If NewNode is a parent (non-leaf),
   For each NewChild of NewNode,
      For each OldChild of OldNode,
         If (check match level from NewChild to OldChild is FullMatch) AND (check match level from OldChild to NewChild is FullMatch)),
            If (Update Matched Graph (NewChild, OldChild)),
                Delete NewChild.
   If all NewChild were deleted,
      Return true.
   Else
      Return false.

---

Step 5: The Query Phase

Figure 3:
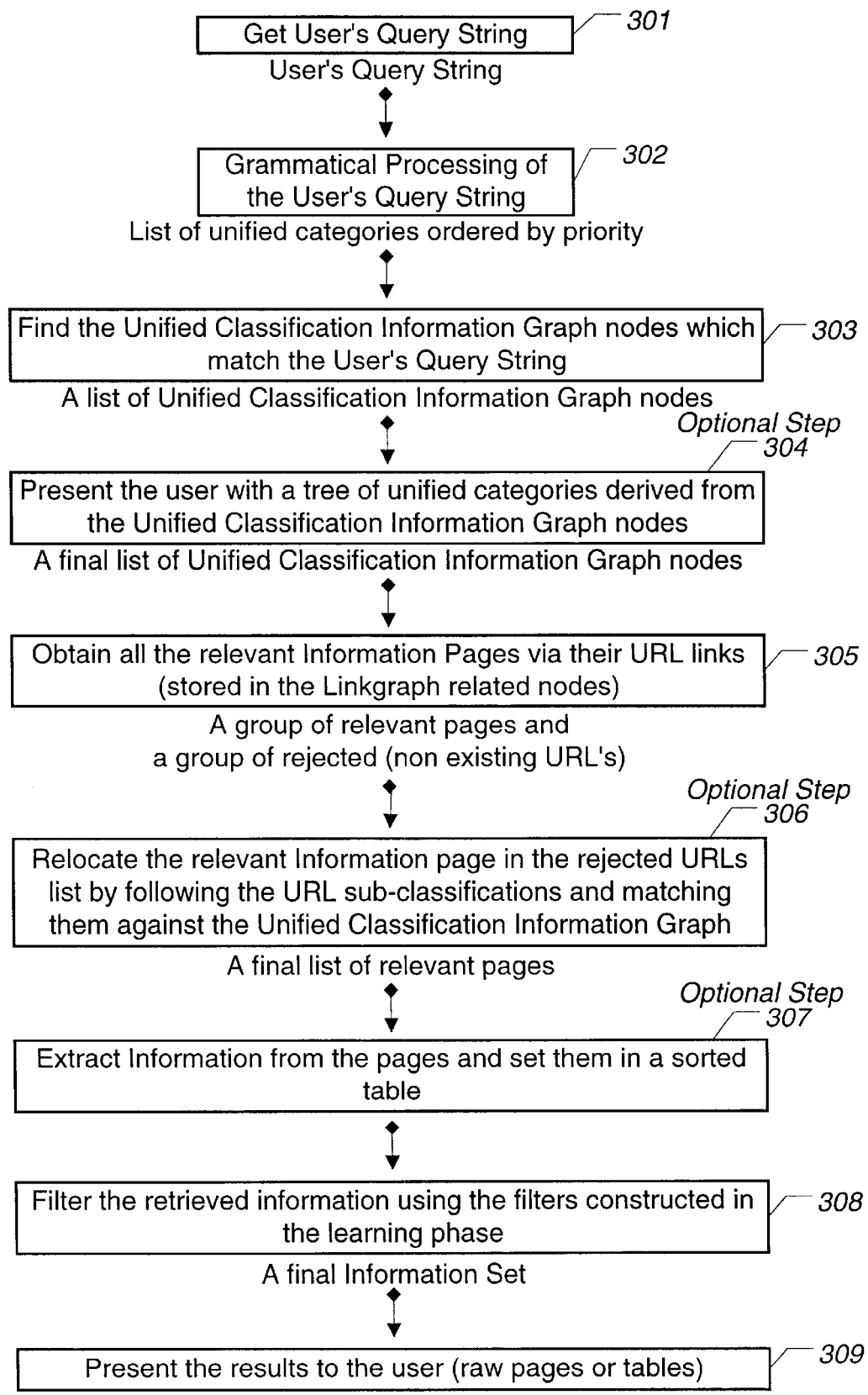
FIG. 3 is a flowchart illustrating a set of user query phase steps, according to one embodiment of the invention.

Referring to FIG. 3, the steps of query phase include:

Step 301: The user uses his end-user system to issue a query to the information integration server software about a required product or service. The query is a free text description of the target product type.

Step 302: The normalization process of the learn phase is subjected to the user's string as if it where a node's category. The result is a CIG node representation of the user query, denoted by QueryNode.

Step 303: Apply the get candidates process for QueryNode as described above in step B.1.

Filter candidates that do not contain the QueryNode head tokens.

For each candidate in the list:

1. If (match level from candidate to QueryNode is FullMatch or PartialMatch) AND (match level from QueryNode to candidate is FullMatch or PartialMatch),
   Then
      Add the candidate to FullMatchedCandidates.

2. If (match level from candidate to QueryNode is FullMatch or Partial Match) AND (match level from NewNode to candidate is NoMatch),
   Then
      Add the candidate to QueryContainingCandidates.

3. If (match level from QueryNode to candidate is NoMatch) AND (match level from candidate to QueryNode is FullMatch or PartialMatch),
   Then
      Add the candidate to QueryIsContainedInCandidates.
         Note: We are now left with 3 groups, FullMatchedCandidates, QueryContainingCandidates, and QueryIsContainedInCandidates.

If FullMatchedCandidates is not empty,
   Show the user the FullMatchedCandidates, and skip to step 304.
If QueryContainingCandidates is not empty,
   Show the user the QueryContainingCandidates, and skip to step 304.
Otherwise
   Show the user the QueryIsContainedInCandidates.

Step 304: This step enables the user to refine the node selected by step 303. All nodes from the UCIG that are in MatchedCandidates, accepted by step 303, are presented. The user may select any node, or may further expand it to select one of its child nodes. Nodes of type "unknown nodes" are not shown to the user. Those are internal nodes, used in step 305. The process ends when the user finishes selecting nodes.

Step 305: For each node in the final list, and for each LinkGraph node of respective node, and from each leaf node accessible from a respective LinkGraph, a product page URL contained in said leaf, is obtained. If the user selects a node which has a sibling node of type "unknown node," then this "unknown node" is automatically selected, and for its connections dynamic positive filters containing all phrases from selected nodes are generated.

Step 306: If the URL (looked for in step 305 above) does not exist, an evaluation step commences at the route of links leading from the catalog beginning to the desired product page: (L1, L2, ... ,Ln), such that L1 leads to the first categories page of the catalog, and Ln is the selected category link leading to a product page. If Ln points to a page that is no longer valid, go back to Li, such that Li is the first link from the end with a valid URL. Advance incrementally from Li to Ln, by bringing the page pointed to by Li, and looking for Li+1 link in the page, until the new URL address for Ln is found. The route from L1 to Ln was prepared off-line in the LinkGraph generation, thus it is possible that in an on-line access one may find that this route does not appear as is in the catalog, because of changes in the categories structure or text. The following changes may be handled:
   If a link name is not found in a page where it is expected to be found, an equivalent link name is sought, where equivalency is set by applying the rules as in the learn phase.
   If Ln used to be a leaf category, pointing to a product page, and in on-line access it is found that it points to another categories page, then all the product pages under the Ln are taken recursively.
   If any Lj is not found (product type is not sold any more, links were added after a link that used to be a leaf, other types of pages were added) then this on-line catalog is not handled on-line, but rather an off-line update process is notified as to which information should be reprocessed.

Step 307: For each product page obtained, the products information in the page is extracted. Then, for each user-request phrase, it aggregates all the products information into an ordered table.

Step 308: Send the results (raw pages or tables) to the end-user system.

Page Type Identification

Each catalog contains a number of page types, e.g.,
Categories page: a page used for browsing the catalog, containing a list of product categories/types/properties. The catalog may contain many categories pages, all in the same structure. The categories page may contain more information in addition to the categories list, e.g., links to other places in the site or outside of the catalog.

Products page: a page with a list of products. Each product has its own description (e.g., product name, part number, manufacturer, price . . . ). The products page may contain additional information beyond the list of products.

Other pages, e.g., search form of the catalog, are ignored at the learn phase.

The categories page and products page are constructed of the same building blocks and expressions. Thus, it is assumed that the following is given:

Categories page regular expression—a regular expression representing the categories page structure such that a page matches the regular expression if and only if it is a categories page.

Products page regular expression: a regular expression representing any products page such that a page matches the regular expression if and only if it is a products page.

For each page, it is matched to the categories page regular expression. If there is a match, the page type is "Categories page." Else, the page is matched to the products page regular expression. If there is a match, the page type is "Products page." Else its type is "Other."

Further Environments and Different Configurations

The preferred embodiment has been described in terms of an electronic commerce application over the Internet infrastructure. However, the main novelty—but not the only one—resides in constructing a unified category classification out of heterogeneous classification.

The underlying concept of the invention can be adapted to other global network environments. Thus, for example, in another embodiment, the basic inter-communication model of hyperlinks is maintained and the on-line catalog is constructed as a graph of classification links—among other links—and information pages. In this example, such a change affects only the LinkGraph formalities since the basic equivalence between the on-line catalog and the LinkGraph is kept.

A non client server, e.g., only one computer. The same generalization applies to the Client-Server environment. The underlying concept of the invention could likewise be easily adapted to be applied with a single computer which performs the learn-phase on the on-line catalogs, and stores the LinkGraph and classification graph locally. Then, the user accesses the user query phase via the very same computer.

Those versed in the art will readily appreciate the various described learn-phase and query-phase operations are only some out of many possible variants to obtain the unified ClassificationGraph in the manner specified. Accordingly, rules and parameters that appear in the specified steps may be modified, added or deleted all as required and appropriate depending upon the particular application. The same applies to the steps which pertain to the user query phase.

All English words mentioned in this document are not part of the algorithm. Rather, they are given as examples to the understanding of the method. Analogous words in a different language could be used. Thus, the method is not restricted to English.

The present invention has been described with a certain degree of particularity, but those versed in the art will readily appreciate that various alterations and modifications may be carried out without departing from the spirit of the invention as defined in the claims.

What is claimed is:

1. A method for dynamically obtaining a unified classification information graph (UCIG), the UCIG providing a navigation system for a user to access sought information, the method comprising the steps of:

(a) providing a plurality of information resources not all necessarily having the same conceptualization system, each resource including a respective hierarchy of categories, leaf categories in each hierarchy being connected to information pages; and (b) generating a UGIC by carrying out knowledge acquisition tasks using at least the hierarchy of categories and the categories of the information resources, the UCIG including a unified hierarchy of categories, leaf categories in the unified hierarchy of categories being connected to information pages of the plurality of information resources, such that information pages accessible through the hierarchy of the plurality of information resources are also accessible through the unified hierarchy of categories of the UCIG.

2. A method as recited in claim 1, wherein at least some of the provided information resources are located in World Wide Web sites on the Internet.

3. A method as recited in claim 1, wherein at least some of the provided information resources are located in databases.

4. A method as recited in claim 1, wherein at least some of the provided information resources are located in on-line catalogs.

5. A method as recited in claim 1, further comprising associating categories in the hierarchy of categories in the plurality of information resources with hyperlinks.

6. A method as recited in claim 1, further comprising associating categories in the hierarchy of categories in the plurality of information resources with menus.

7. A method as recited in claim 1, wherein the step of providing the plurality of information resources further includes:

(i) initializing to generate for each information resource a link graph that corresponds to the information resource, each link graphs including one or more link graph categories;

(ii) normalizing the one or more link graph categories of each link graph to generate a classification graph for the information resource that includes classification graph categories; and (iii) unifying the classification graphs to generate the UCIG.

8. A method according to claim 7, further comprising providing a URL pointer of an on-line catalog for generating the link graph.

9. A machine having a memory containing data representing a unified classification information graph that was generated by the method of claim 1.

10. A memory storing data for access by an application program, the application program accessible to a user through a user interface for the user to access sought information, the application program being executed on a data processing system, the data comprising:

a data structure including a unified classification information graph generated by carrying out knowledge acquisition tasks from a plurality of information resources not necessarily all having the same conceptualization system, the plurality of information resources providing access to information pages, the unified classification graph including a unified hierarchy of categories, leaf categories in the unified hierarchy being connected to information pages of the information resources, such that information pages accessible through the information resources are also accessible through the hierarchy of the unified classification information graph.

11. A system for dynamically obtaining a unified classification information graph that provides a navigation system for a user to access sought information, the system comprising:

an input device receiving a plurality of information resources not all necessarily having the same conceptualization system, the information resources each including a respective hierarchy of categories, leaf categories in the hierarchy being connected to information pages; and a generator to generate a unified classification information graph by carrying out knowledge acquisition tasks utilizing at least the hierarchy of categories and the categories of the information resources, the unified classification information graph including a unified hierarchy of categories, leaf categories in the unified hierarchy of categories being connected to information pages of the plurality of information resources, such that information pages accessible through the hierarchy of the information resources are also accessible through the unified hierarchy of the unified classification information graph.

12. A system as recited in claim 11, wherein at least some of the information resources are located in sites of the Internet.

13. A system as recited in claim 11, wherein at least some of the information resources are located in databases.

14. A system as recited in claim 11, wherein at least some of the information resources are located in on-line catalogs.

15. A system as recited in claim 11, wherein categories in the hierarchy of categories in the information resources are associated with hyperlinks.

16. A system as recited in claim 11, wherein categories in the hierarchy of categories in the information resources are associated with menus.

17. A system as recited in claim 11, wherein the generator includes:

an initialization unit for generating a respective link graph corresponding to each information resource, each link graph including link graph categories;

a normalization unit for normalizing the link graph categories to generate for each link graph a corresponding classification graph that includes classification graph categories; and a unifying unit for unifying the classification graphs to generate the unified classification information graph.

18. A system according to claim 17, wherein generating one of the link graphs includes providing a URL pointer of an on-line catalog.

19. A method for retrieving information of interest using a unified classification information graph (UCIG), the UCIG providing a navigation system for a user to access sought information, the UCIG generated by a process including:

providing a plurality of information resources not necessarily having the same conceptualization system, each resource including a respective hierarchy of categories, leaf categories in each hierarchy being connected to information pages; and generating a UGIC by carrying out knowledge acquisition tasks using at least the hierarchy of categories and the categories of the information resources, the UCIG including a unified hierarchy of categories, leaf categories in the unified hierarchy of categories being connected to information pages of the plurality of information resources, such that information pages accessible through the hierarchy of the plurality of information resources are also accessible through the unified hierarchy of categories of the UCIG, the method comprising:
providing a user query; and
identifying unified categories in the unified classification information graph which substantially match the query.

20. A method as recited in claim 19, further comprising the step of identifying the at least one information page in the unified classification information graph that is connected to the categories of the unified graph.

21. A system for retrieving information of interest using a unified classification information graph (UCIG), the UCIG generated by a process including:

providing a plurality of information resources not necessarily having the same conceptualization system, each resource including a respective hierarchy of categories, leaf categories in each hierarchy being connected to information pages; and generating a UGIC by carrying out knowledge acquisition tasks using at least the hierarchy of categories and the categories of the information resources, the UCIG including a unified hierarchy of categories, leaf categories in the unified hierarchy of categories being connected to information pages of the plurality of information resources, such that information pages accessible through the hierarchy of the plurality of information resources are also accessible through the unified hierarchy of categories of the UCIG, the system comprising:
an interface for receiving a user query; and
an identifier identifying unified categories in the unified classification information graph which substantially match the query.

22. A system as recited in claim 21, wherein in the case of the identifier identifying a particular category that substantially matches the query and that is a leaf category attached to one or more particular information pages, the identifier also identifies the one or more particular information pages.

23. A method for dynamically updating a provided unified hierarchy of categories representable by a unified classification information graph (UCIG), leaf categories in the unified hierarchy of categories connected to information pages of a first plurality of information pages, the UCIG providing a navigation system for a user to access sought information, the method comprising the steps of:

providing one or more additional information resources that each includes a hierarchy of categories, all the additional information resources not necessarily having the same conceptualization system, leaf categories in the hierarchy of any of the additional information resources being connected to information pages of a second plurality of information pages;

providing the unified classification graph of the unified hierarchy of categories; and generating an updated unified classification information graph by carrying out knowledge acquisition tasks utilizing at least the hierarchy of categories and the categories of the additional information resources, the updated unified classification graph including the provided unified hierarchy of categories, leaf categories in the updated unified classification graph being connected to information pages of the first and second plurality of information pages;

such that information pages accessible through the hierarchy of the additional information resources are also accessible through the updated unified classification information graph.

24. A method as recited in claim 23, wherein at least some of the provided additional information resources are located in sites of the Internet.

25. A method as recited in claim 23, wherein at least some of the provided additional information resources are located in databases.

26. A method as recited in claim 23, wherein at least some of the provided additional information resources are located in on-line catalogs.

27. A method as recited in claim 23, further comprising associating categories in the hierarchy of categories in the provided additional information resources with hyperlinks.

28. A method as recited in claim 23, further comprising associating categories in the hierarchy of categories in the provided additional information resources with menus.

29. A method as recited in claim 23, wherein generating the updated unified classification information graph includes:

(i) initializing to generate for each provided additional information resource a link graph that corresponds to the information resource, each link graph including link graph categories;

(ii) normalizing the link graph categories of each link graph to generate one or more classification graphs that correspond to the one or more link graphs and that each includes classification graph categories; and (iii) unifying the one or more classification graphs with the provided unified classification information graph to generate the updated unified classification information graph.

30. A method according to claim 29, further comprising providing a URL pointer of an on-line catalog for generating the link graph.

31. A carrier medium carrying one or more computer readable code segments to cause the one or more processors of a computer system to dynamically generate a unified classification information graph (UCIG), the UCIG providing a navigation system for a user to access sought information, the carrier medium comprising:

for a provided plurality of information resources, the information resources not necessarily having the same conceptualization system, each resource including a respective hierarchy of categories, leaf categories in each hierarchy being connected to information pages, code to cause the one or more processors to generating a UGIC by carrying out knowledge acquisition tasks using at least the hierarchy of categories and the categories of the UCIG including a unified hierarchy of categories, leaf categories in the unified hierarchy of categories being connected to information pages of the plurality of information resources, such that information pages accessible through the hierarchy of the plurality of information resources are also accessible through the unified hierarchy of categories of the UCIG.

32. A carrier medium as recited in claim 31, wherein at least some of the provided information resources are located in World Wide Web sites on the Internet.

33. A carrier medium as recited in claim 31, wherein at least some of the provided information resources are located in databases.

34. A carrier medium as recited in claim 31, wherein at least some of the provided information resources are located in on-line catalogs.

35. A carrier medium as recited in claim 31, wherein categories in the hierarchy of categories in the plurality of information resources are associated with hyperlinks.

36. A carrier medium as recited in claim 31, wherein categories in the hierarchy of categories in the plurality of information resources are associated with menus.

37. A carrier medium as recited in claim 31, further comprising: wherein the step of providing the plurality of information resources further includes:

code to cause the one or more processors to generate for each information resource a link graph that corresponds to the information resource, each link graph including one or more link graph categories;

code to cause the one or more processors to normalize the one or more link graph categories of each link graph to generate for each link graph a classification graphs that includes classification graph categories; and code to cause the one or more processors to unify the classification graphs to generate the UCIG.

38. A carrier medium according to claim 37, wherein the generating of the link graph uses a provided URL pointer of an on-line catalog.

39. A method for dynamically updating a provided unified hierarchy of categories representable by a unified classification information graph (UCIG), leaf categories in the unified hierarchy of categories connected to information pages of a first plurality of information pages, the UCIG providing a navigation system for a user to access sought information, the method comprising the steps of:

providing one or more additional information resources that each includes a hierarchy of categories, all the additional information resources not necessarily having the same conceptualization system, leaf categories in the hierarchy of any of the additional information resources being connected to information pages of a second plurality of information pages;

providing the unified classification graph of the unified hierarchy of categories; and generating an updated unified classification information graph by carrying out knowledge acquisition tasks utilizing at least the hierarchy of categories and the categories of the additional information resources, the updated unified classification graph including an updated unified hierarchy of categories, leaf categories in the updated unified hierarchy of categories being connected to information pages of the first and second plurality of information pages;

such that information pages accessible through the hierarchy of the additional information resources are also accessible through the updated unified hierarchy of the updated unified classification information graph.

40. A method as recited in claim 39, wherein generating the updated unified classification information graph includes:

(i) initializing to generate for each provided additional information resource a link graph that corresponds to the information resource, each link graph including link graph categories;

(ii) normalizing the link graph categories of each link graph to generate one or more classification graphs that correspond to the one or more link graphs and that each includes classification graph categories; and (iii) unifying the one or more classification graphs with the provided unified classification information graph to generate the updated unified classification information graph.

* * * * *